Patented Oct. 27, 1936

2,058,510

UNITED STATES PATENT OFFICE 2,058,510

SYNTHETIC RESINS

Henry S. Rothrock, Wilmington, Del., assignor to E. I. du Pont de Nemours & Company, Wilmington, Del., a corporation of Delaware No Drawing. Application April 3, 1935, Serial No. 14,530

14 Claims. (Cl. 260—2)

This invention relates to resinous materials and more particularly to new and improved polyether resins obtained by reacting certain dihydric phenols and organic polyhalides.

In the application of J. A. Arvin, Serial Number 651,634, filed January 13, 1933, there is disclosed the preparation of a new class of resins described as ether resins. These resins are obtained by reacting polyhydric phenols, or certain of their salts, with organic polyhalides whose halogen atoms are attached to aliphatic carbon atoms.

In my investigations on resins of this character I have discovered that if organic polyhalides of the mentioned type are reacted with polynuclear dihydric phenols of the kind described below resins are obtained which have markedly higher softening temperatures than those previously prepared. This improvement in resins of the present type very considerably enhances their utility in the arts.

This invention has as an object the preparation of new and useful resins. A further object is the preparation of new resins of the kind mentioned above which are characterized by higher softening temperatures than possessed by the ether resins heretofore prepared. Other objects will appear hereinafter.

The above objects are accomplished by condensing aliphatic polyhalides of the kind described in the above identified application with a polynuclear dihydric phenol containing an alkyl substituted cyclohexane ring, the phenolic hydroxyls in said phenol being attached to different carbocyclic nuclei. A phenol of this kind may be represented by the general formula:

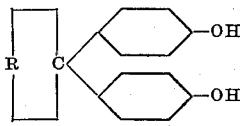

in which R is an alkyl substituted cyclohexane residue.

The polyhalides referred to above with which the specified phenols are reacted are organic compounds containing at least two halogen atoms attached to different carbon atoms which are in turn joined to other atoms by single bonds only.

My new resins are preferably made by reacting chemically equivalent quantities of the organic polyhalide and the alkali or alkaline earth metal salt of the polynuclear dihydric phenol. By this is meant that one mol of a dihydric phenol will require one mol of a dihalide. Variations from chemically equivalent quantities are not precluded, however, but the greater the variation, that is, excess of one or the other of the reactants, the less desirable will be the resin, and if too highly unbalanced ratios are reached a high molecular weight polymer can no longer be obtained.

In the preferred embodiment of my invention the polynuclear dihydric phenol is mixed with an aqueous solution of the theoretical quantity, or a slight excess, of alkali and heated at a relatively high temperature, above 70° C. and preferably above 100° C., but below the decomposition temperature of the ingredients, with an equivalent amount of the dihalide. The apparatus preferably consists of a vessel fitted with a thermometer, a reflux condenser, and a stirrer designed to sweep the sides and bottom of the vessel. Heating is continued until the desired state of condensation is obtained or until as much of the phenol and dihalide are reacted as possible. The phenol is taken to be largely reacted when the alkalinity of the mixture remains substantially constant; where the theoretical amount of alkali was originally used, the final product is nearly neutral. In view of the fact that side reactions will occur, this method of following the progress of the resinification is only approximate. The reaction can also be followed by distilling a few drops of the reaction mixture and examining the cold distillate. If the distillate is cloudy some of the halide is uncombined and refluxing is continued. When the distillate is clear, the water can be distilled off without loss of halide; this will then permit the use of higher temperatures in the later stages of the reaction with a resultant decrease in time of preparation. Further heating after the distillate becomes clear is generally necessary, inasmuch as this clear point only shows that essentially all of the halide has combined by elimination of at least one of its halogen atoms, but not necessarily all of them. The final reaction product is generally very viscous, and is opaque due to occluded salt. When the reaction mixture has reached the desired degree of condensation, or when its alkalinity approaches constancy, it is taken up while in the reaction vessel with a small amount of an aromatic hydrocarbon solvent, e. g., toluene and poured on to trays while still hot and most of the toluene distilled off. While still containing a small amount of toluene the product is transferred, preferably in molten condition, to a steam-jacketed Werner-Pfleiderer mixer, washed with hot water until salt-free, then treated with dilute hydrochloric acid, and finally washed free of chlorides with hot water. The resin is then dried either in a vacuum oven or in a steam-jacketed Werner-Pfleiderer mixer.

The polyether resins of this invention may also be made by reaction of the polyhalide with the polynuclear dihydric phenol with or without alkali at super-atmospheric pressures, either in the presence or absence of an inert diluent.

The following examples are illustrative of resins of the kind disclosed and claimed herein:

Example I

| | Parts by weight |
|---|---|
| (A) Sodium hydroxide (48.3% solution) | 67.5 |
| (B) Water | 90.0 |
| (C) 1,1-bis(4-hydroxyphenyl)-4-methyl-cyclohexane | 112.8 |
| (D) $\beta,\beta'$ dichlorodiethyl ether | 57.3 |

Ingredients A, B and C were placed in the order named in the reaction vessel and heated to refluxing with stirring. Ingredient D was then added slowly and refluxing continued for 16 hours, at the end of which time a few drops were distilled and found to be clear. Water was then distilled off, the temperature allowed to rise gradually to 235° C. where it was maintained for 4.5 hours with stirring. The resin was poured out of the reaction flask while hot, allowed to cool to room temperature, and dissolved in toluene. The solution was allowed to stand, the clear supernatant liquid decanted off, washed thoroughly with water, and then successively with dilute hydrochloric acid and water. The resin was recovered by evaporation of the toluene, and dried by heating it in a vacuum oven for 24 hours at 110° C. A hard, somewhat friable resin softening at about 90° C., which showed no tendency to become either insoluble or infusible upon prolonged heating, was obtained.

The 1,1-bis(4-hydroxyphenyl)-4-methylcyclohexane used in the above example was made as follows:

Twenty-eight (28) parts of 4-methylcyclohexanone, 47 parts of phenol, and 145 parts of concentrated hydrochloric acid (sp. gr. 1.19) were placed in a reaction vessel fitted with a loop stirrer, thermometer, and condenser and stirred continuously at 42–43° C. for 19 hours. The paste-like semi-crystalline material was washed acid-free with water, and purified by repeated crystallizations from toluene. The product obtained melted at 178–179° C. and was identified as 1,1-bis(4-hydroxyphenyl)-4-methylcyclohexane.

Ingredient C of Example I may be replaced by a product obtained from phenol and commercial methylcyclohexanone, which contains the three isomers, and a resin of equally good character obtained.

Example II

| | Parts by weight |
|---|---|
| (A) 1,1-bis(4-hydroxyphenyl)-3,5-dimethyl-cyclohexane | 71 |
| (B) Sodium hydroxide (47.8% solution) | 41 |
| (C) Water | 70 |
| (D) $\beta,\beta'$-dichlorodiethyl ether | 35 |

Ingredients A, B and C were placed in the order named in the reaction vessel and heated with stirring to refluxing temperature. Ingredient D was then added slowly with stirring over a period of 10 minutes and refluxing continued for 17.5 hours, at the end of which time a test portion of distillate was clear. Water was then distilled off, the temperature allowed to rise gradually to between 220 and 235° C. where it was held for approximately 4 hours with stirring. The resin was allowed to cool to room temperature, dissolved in toluene, filtered, the filtrate washed with water, and then successively with dilute hydrochloric acid and water. The resin was recovered by evaporation of the toluene, and dried by heating it in a vacuum oven for 18 hours at 120° C. The product obtained was a hard, clear, pale yellow resin softening at about 95° C.

Example III

| | Parts by weight |
|---|---|
| (A) 1,1-bis(4-hydroxyphenyl)-4-tertiary-amyl-cyclohexane | 16 |
| (B) Sodium hydroxide (47.65% solution) | 8 |
| (C) Water | 15 |
| (D) $\beta,\beta'$-dichlorodiethyl ether | 6.7 |

Ingredients A, B and C were placed in the order named in the reaction vessel and heated with stirring to refluxing temperature. Ingredient D was then added slowly and refluxing continued for 16 hours, at the end of which time a test portion of distillate was clear. Water was then distilled off, the temperature allowed to rise gradually to 235° C. where it was maintained for 2.5 hours with stirring. The resin was allowed to cool to room temperature, dissolved in toluene, the solution filtered, washed with water, and then successively with dilute hydrochloric acid and water. The resin was recovered by evaporation of the toluene, and dried overnight in a steam oven at about 110° C. The product obtained was a light-colored resin softening at about 110° C.

The phenol used in Example II was prepared in accordance with application Serial Number 5,301, filed February 6, 1935, by reacting at slightly elevated temperatures (30–60° C.) phenol and 3,5-dimethylcyclohexanone in the presence of hydrogen chloride. The phenol used in Example III was similarly prepared by reacting phenol with 4-tertiary-amyl-cyclohexanone as disclosed and claimed in application Serial Number 5,299, filed February 6, 1935.

The phenols mentioned in the examples may be replaced by other phenols corresponding to the definition previously given, as for instance the various new phenols disclosed in the applications mentioned above. Examples of these phenols include such compounds as 1,1-bis(4-hydroxy-2-methylphenyl)-3,5-dimethylcyclohexane, 1,1-bis(4-hydroxyphenyl)-3,5-dibutylcyclohexane, 1,1-bis(4-hydroxyphenyl)-3-methyl-4-ethylcyclohexane, 1,1-bis(4-hydroxyphenyl)-4-tertiary-butylcyclohexane, and 1,1-bis(4-hydroxyphenyl)-4-tertiary-heptylcyclohexane.

In place of the $\beta, \beta'$-dichlorodiethyl ether of the examples, other aliphatic polyhalides containing at least two halogen atoms attached to different carbon atoms which are in turn joined to other atoms by single bonds only may be used. Examples of these include symmetrical dichloroacetone, 1,4-xylylene dibromide, 2,3-dichlorodioxane, as well as any of the polyhalides disclosed in the mentioned application Serial Number 651,634.

The sodium hydroxide mentioned in the examples may likewise, as also disclosed in the application just mentioned, be replaced by lithium or potassium hydroxide or by other alkali metal hydroxides. Alkaline earth metal hydroxides may also be used, but a lesser degree of success is obtained because of the poor solubilites of the phenolic salts.

As previously explained under the general description of my process, it is advantageous to purify my new resins by adding thereto a small amount of toluene while the resin is still in the reaction vessel, then pour the mixture into a heated Werner-Pfleiderer mixer, neutralize it with dilute hydrochloric acid, and finally wash the product with hot water until it is salt-free. The resin may then be dried either in the Werner-Pfleiderer mixer or under a vacuum. This improved procedure for washing out salt from high softening polyether resins is described more specifically below.

To the unpurified molten resin of Example I is added 5-10% of toluene. The mixture is poured, while still hot, on to a tray and the major portion of the toluene removed by heating in a vacuum oven. The resin, while still in a molten condition and containing a small amount of toluene, is poured into a steam-jacketed Werner-Pfleiderer mixer and washed with hot water to remove salt, then washed with dilute hydrochloric acid, and finally washed free of chlorides with hot water. The salt-free resin is then transferred to a tray and vacuum dried overnight at about 120-130° C.

While the method just described for obtaining the purified resins is particularly advantageous in connection with the high softening type of polyether resin described herein, it may also be advantageously used in the purification of low melting types of polyether resins. The surprising feature of this method is that even though the solvent used to plasticize the resin is volatile it is retained so tenaciously that there is substantially no loss thereof throughout the washing procedure. In place of the toluene of the above example I may use other polyether resin solvents, e. g., benzene, xylene, etc.

The importance of the alkyl substituent on the cyclohexane nucleus of the phenol, as it affects the softening point of the polyether resins made therefrom, is shown by the fact that the phenol used in Example I, namely, 1,1-bis(4-hydroxyphenyl)-4-methylcyclohexane, of the formula

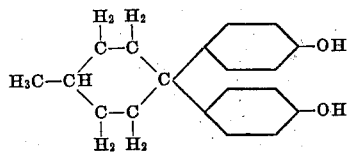

yields a resin softening at about 90° C. whereas the analogous resin from 1,1-bis(4-hydroxyphenyl)cyclohexane, which has the cyclohexane nucleus unsubstituted, softens at about 80° C.

The significance of the presence of the alkyl group in the cyclohexane residue, as distinguished from its presence in the phenolic nucleus, is shown by the fact that the resin of Example II made from, 1,1-bis(4-hydroxyphenyl)-3,5-dimethylcyclohexane, a polynuclear dihydric phenol having two methyl groups in the cyclohexane ring, softens at about 95° C. as compared to about 65° C. for the analogous resin obtained from 1,1-bis(4-hydroxy-3-methylphenyl)cyclohexane, which contains a methyl group on each benzene ring.

It will be observed also that the resin of Example III, made from a phenol having the methyl group of the above structural formula replaced by the tertiary alkyl group

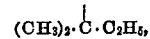

has a softening point of 110° C. as compared to 80° C. for the resin made from the similar phenol having the cyclohexane group unsubstituted. This is very unexpected since the normal influence of increased "aliphaticity" is a lowering of the softening point.

The polyether resins of this invention are superior to similar resins known heretofore in having a higher softening temperature. This improved softening point is obtained without sacrifice in the excellent properties inherent to resins of this class such as good film-forming qualities, chemical inertness, good durability on outdoor exposure, toughness, and solubility in aromatic hydrocarbons. In view of their higher softening temperature, the field of utility of these resins is markedly greater than that of resins from phenols such as bis(4-hydroxyphenyl)dimethylmethane. These higher softening temperatures make it possible to utilize the new resins in applications for which former types of polyether resins were largely unsuited, e. g., all uses in which the resin must withstand moderate heat without deformation. Among these are unsupported films (substitutes for thin transparent sheets of regenerated cellulose); fibers; linings for containers which are to be sterilized; glass substitutes for special uses such as automobile windshields, nursing bottles, household dishes, molded electrical appliances, linings for battery jars, liners for chemical equipment, etc.; dentures; adhesives where the laminated objects are subjected to substantial temperatures such as washable double-textured fabric materials; certain types of molded articles such as pipe-stems, kitchen furniture, etc. In addition to these special uses, my new resins are also suited admirably for most of the uses disclosed in application Serial Number 651,634.

As many apparently widely different embodiments of this invention may be made without departing from the spirit and scope thereof, it is to be understood that I do not limit myself to the specific embodiments thereof except as defined in the appended claims.

I claim:
1. A polyether resin comprising the reaction product of ingredients comprising essentially a polyhydric phenol containing an alkyl substituted cyclohexane ring, the phenolic hydroxyls in said polyhydric phenol being attached to different carbocyclic nuclei, with an organic polyhalide whose halogen atoms are attached to different carbon atoms which are in turn joined to other atoms by single bonds only.

2. A polyether resin comprising the reaction product of an organic polyhalide whose halogen atoms are attached to different carbon atoms which are in turn joined to other atoms by single bonds only with an alkali metal salt of a phenol of the formula

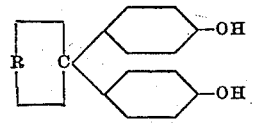

in which R is an alkyl substituted cyclohexane residue.

3. A polyether resin comprising the reaction product of an alkali metal salt of 1,1-bis(4-hydroxyphenyl) methylcyclohexane and an organic polyhalide whose halogen atoms are attached to different carbon atoms which are in turn joined to other atoms by single bonds only.

4. A polyether resin comprising the reaction product of an alkali metal salt of 1,1-bis(4-hydroxyphenyl)-3,5-dimethylcyclohexane and an organic polyhalide whose halogen atoms are attached to different carbon atoms which are in turn joined to other atoms by single bonds only.

5. A polyether resin comprising the reaction product of an alkali metal salt of 1,1-bis(4-hydroxyphenyl)-4-tertiary-amyl-cyclohexane and an organic polyhalide whose halogen atoms are attached to different carbon atoms which are in turn joined to other atoms by single bonds only.

6. A process for making polyether resins which comprises reacting in polymerizing proportions ingredients comprising essentially a polyhydric phenol containing an alkyl substituted cyclohexane ring, the phenolic hydroxyls in said polyhydric phenol being attached to different carbocyclic nuclei, with an organic polyhalide whose halogen atoms are attached to different carbon atoms which are in turn joined to other atoms by single bonds only.

7. A process for making polyether resins which comprises reacting in polymerizing proportions an organic polyhalide whose halogen atoms are attached to different carbon atoms which are in turn joined to other atoms by single bonds only with an alkali metal salt of a phenol of the formula

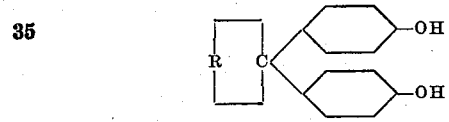

in which R is an alkyl substituted cyclohexane residue.

8. A process for making polyether resins which comprises reacting in polymerizing proportions an alkali metal salt of 1,1-bis(4-hydroxyphenyl)-methylcyclohexane and an organic polyhalide whose halogen atoms are attached to different carbon atoms which are in turn joined to other atoms by single bonds only.

9. A process for making resins which comprises reacting in polymerizing proportions the sodium salt of 1,1-bis(4-hydroxyphenyl)methylcyclohexane and $\beta,\beta'$-dichlorodiethyl ether.

10. A process for making polyether resins which comprises reacting in polymerizing proportions an alkali metal salt of 1,1-bis(4-hydroxyphenyl)-3,5-dimethylcyclohexane and an organic polyhalide whose halogen atoms are attached to different atoms which are in turn joined to other atoms by single bonds only.

11. A process for making resins which comprises reacting in polymerizing proportions the sodium salt of 1,1-bis(4-hydroxyphenyl)-3,5-dimethylcyclohexane and $\beta,\beta'$-dichlorodiethyl ether.

12. A process for making polyether resins which comprises reacting in polymerizing proportions an alkali metal salt of 1,1-bis(4-hydroxyphenyl)-4-tertiary-amyl-cyclohexane and an organic polyhalide whose halogen atoms are attached to different atoms which are in turn joined to other atoms by single bonds only.

13. A process for making resins which comprises reacting in polymerizing proportions the sodium salt of 1,1-bis(4-hydroxyphenyl)-4-tertiary-amyl-cyclohexane and $\beta,\beta'$-dichlorodiethyl ether.

14. A process for making polyether resins which comprises reacting in polymerizing proportions an organic polyhalide whose halogen atoms are attached to different carbon atoms which are in turn joined to other atoms by single bonds only with an alkali metal salt of a phenol of the formula

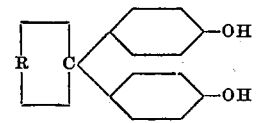

in which R is an alkyl substituted cyclohexane residue, adding volatile organic solvent to the reaction product, kneading the resin in a heated internal-type mixer, while first neutralizing with acid and then washing with water until free of salt.

HENRY S. ROTHROCK.